(No Model.)
J. NORTH.
GARDEN RAKE.
No. 534,279. Patented Feb. 19, 1895.
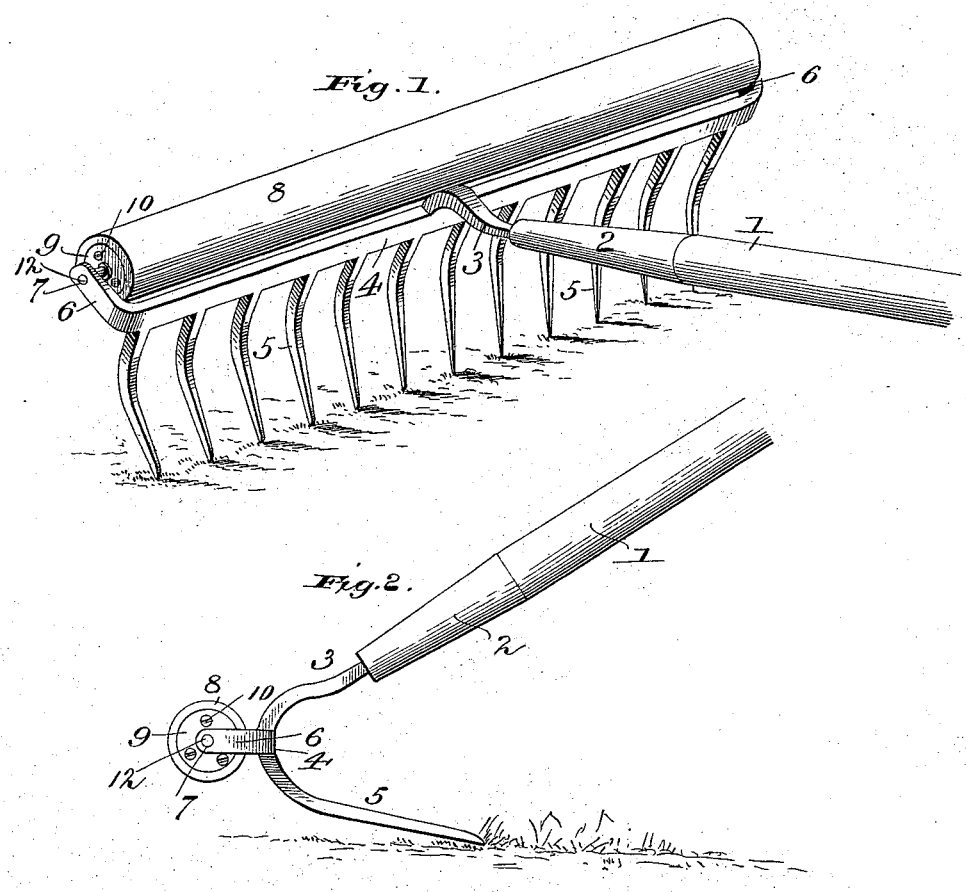
WITNESSES:
F. L. Ourand
W. L. Coombs
INVENTOR:
Joseph North,
Louis Bagger & Co.
Attorneys.

UNITED STATES PATENT OFFICE.

JOSEPH NORTH, OF CLAYVILLE, NEW YORK, ASSIGNOR OF ONE-HALF TO BENJAMIN T. GILBERT, OF NEW HAVEN, CONNECTICUT.

GARDEN-RAKE.

SPECIFICATION forming part of Letters Patent No. 534,279, dated February 19, 1895.

Application filed March 13, 1894. Serial No. 503,487. (No model.)

*To all whom it may concern:*

Be it known that I, JOSEPH NORTH, a citizen of the United States, and a resident of Clayville, in the county of Oneida and State of New York, have invented certain new and useful Improvements in Garden-Rakes; and I do hereby declare that the following is a full, clear, and exact description of the invention, which will enable others skilled in the art to which it appertains to make and use the same, reference being had to the accompanying drawings, which form a part of this specification.

My invention relates to improvements in combined hand rakes and rollers, which can be used as an ordinary garden rake, and by reversing the same or turning the rake upside down can be employed as a roller for rolling and leveling the ground.

The invention consists essentially in a handle, a rake bar provided with teeth and having its ends bent at right angles forming bearings for the journals of a roller which runs lengthwise of said bar a slight distance above the same, as will be hereinafter fully described and claimed.

In the accompanying drawings: Figure 1 is a perspective view of a combined rake and roller constructed in accordance with my invention. Fig. 2 is a side elevation of the same.

In the said drawings the reference numeral 1 designates the handle having the usual socket 2, to receive the arm 3, of the rake bar 4. This rake bar is provided with teeth 5, and has each end bent at a right angle forming short arms 6, having apertures 7, at the ends. These parts are preferably made integral, although this is not necessary.

The arms 6 form bearings for a roller 8, running lengthwise of the rake bar and located a short distance above the same. At each end the roller is provided with a metal cap 9, secured thereto by screws or bolts 10, which caps are formed with short journals 12, which engage with the apertures in the arms 6.

The device is intended for removing twigs, leaves, stones and other refuse from gardens and digging up weeds and other undesirable plants, and also for leveling the earth loosened in pulling up such plants. The rake can be employed in the ordinary manner in removing stones, weeds and other refuse and also loosening the earth around growing plants. It is then reversed or turned upside down and the roller drawn back and forth over the loosened earth and thus leveling the same.

Having thus described my invention, what I claim is—

In a hand rake, the combination with the handle and the socket secured thereto, of the horizontal bar provided at its center with an arm engaging with said socket, and the rake teeth, the ends of said bar being bent outwardly at a right angle, and the roller journaled in said bent arms, substantially as described.

In testimony that I claim the foregoing as my own I have hereunto affixed my signature in presence of two witnesses.

JOSEPH NORTH.

Witnesses:
JOHN LYDON,
GEO. WORTH.